(12) United States Patent
Hoskins et al.

(10) Patent No.: US 8,307,679 B2
(45) Date of Patent: Nov. 13, 2012

(54) CRIMP VALIDATION USING CRIMP FORCE MONITORING APPARATUS, SYSTEMS AND METHODS

(75) Inventors: Jeff Hoskins, Versailles, MO (US); Dennis Irwin, Versailles, MO (US); Kelly Kirks, Denver, CO (US)

(73) Assignee: The Gates Corporation, Denver, CO (US)

( * ) Notice: Subject to any disclaimer, the term of this patent is extended or adjusted under 35 U.S.C. 154(b) by 399 days.

(21) Appl. No.: 12/799,032

(22) Filed: Apr. 16, 2010

(65) Prior Publication Data

US 2010/0326156 A1    Dec. 30, 2010

Related U.S. Application Data

(60) Provisional application No. 61/212,962, filed on Apr. 17, 2009.

(51) Int. Cl.
*B21D 39/04*    (2006.01)
(52) U.S. Cl. ....................................................... 72/19.9
(58) Field of Classification Search ............... 72/19.9, 72/21.4, 21.5
See application file for complete search history.

(56) References Cited

U.S. PATENT DOCUMENTS

| | | | |
|---|---|---|---|
| 5,651,282 A | 7/1997 | Fisher | |
| 5,829,289 A * | 11/1998 | Fisher et al. | 72/19.9 |
| 6,035,775 A | 3/2000 | Nghiem | |

* cited by examiner

*Primary Examiner* — Faye Francis
(74) *Attorney, Agent, or Firm* — J. A. Thurnau, Esq.; P. N. Dunlap, Esq.

(57) ABSTRACT

A method monitoring crimping of a fitting onto a hose, or the like, includes monitoring fluid pressure for carrying out the crimp at discrete diameters of the crimp, during the crimp, and analyzing crimp data reflecting the fluid pressure with respect to the diameters of the crimp during the crimp to determine if the fluid pressure is above a minimum pressure at particular diameters during the crimp, below a maximum pressure during the particular diameters during the crimp, and/or varies significantly from earlier crimps, to determine if the crimp is acceptable. A system for monitoring crimping of a fitting onto a hose end or the like might include a pressure sensor deployed in conjunction with a crimper to measure fluid pressure employed by the crimper during the crimp, a die diameter monitor and, a controller operatively connected to the crimper and sensors.

21 Claims, 5 Drawing Sheets

CRIMP VALIDATION USING CRIMP FORCE MONITORING APPARATUS, SYSTEMS AND METHODS

CROSS-REFERENCE TO RELATED APPLICATION

This application claims the benefit of U.S. Provisional Patent Application Ser. No. 61/212,962, also entitled Crimp Validation Using Crimp Force Monitoring Apparatus, Systems and Methods, filed Apr. 17, 2009, which is incorporated herein by reference.

BACKGROUND OF THE INVENTION

1. Field of the Invention

This invention relates generally to crimping and swaging operations such as may be applied to ferrules for use in fluid power hose connections, on steel cables, or the like. More particularly the present invention relates to validation of the crimp or swaging process by using crimp or swage force monitoring apparatus, systems and methods, and specifically to automatic control systems and methods for the detection of defective crimps during crimping or swaging processes.

2. Description of the Prior Art

Hydraulic crimpers or swagers are used to assemble hydraulic couplings (fittings) to hose. Such fittings, which are typically post assembled to an end of a finished hose product, typically have a male-stem portion that is insertable into a hose end and a ferrule that is concentric with the male-stem. Together, the male-stem and ferrule define an annular cavity for receiving a hose end. An insert, such as disclosed U.S. Pat. No. 5,267,758 and/or in U.S. patent application Ser. Nos. 12/313,400 and 12/313,406, filed Nov. 20, 2008, each of which are incorporated herein by reference, may be fitted between the ferrule and the hose. The fitting is retained by pinching the hose end in the annular cavity between the ferrule and stem such as by radially reducing some part or element of the ferrule, using a crimping or swaging process. Crimping radially reduces the size of the ferrule by crushing it to a smaller diameter, using a plurality of circumjacently arranged die fingers. Swaging radially reduces the size of the ferrule by forcing it through a (tapered) set of dies. Both crimpers and swagers are typically hydraulically powered/operated. Similarly, crimping or swaging operations may be used in other operations, such as for crimping or swaging ferrules to steel cables for forming a loop in such a cable or to splice two cables together.

Currently there are no crimpers or swagers that can detect defective assemblies during the crimp swage cycle. Failure of defectively crimped or swaged products can be catastrophic in nature. Such defects are typically caused by crimping or swaging failure modes such as the hose not being fully inserted onto the stem and/or into the ferrule prior to crimping, and/or no serrations in the ferrule or on an insert disposed in the ferrule, or by incorrect hose dimensions, or by incorrect crimper diameter settings.

Typical existing methods for detecting such failure modes employ off line processes such as pressure testing of completed final assemblies during post production checks to a predetermined proof pressure, tension load testing to a predetermined proof load or x-raying of crimped product to ensure full insertion and proper position of components. All of these processes are very costly, are not necessarily sensitive enough to capture defective crimping, and typically add additional steps and cost to product production. For example, "offline" pressure testing equipment is very expensive, has slow cycle times, requires additional labor, and its use adds significantly to production times.

Another existing method for detecting potentially defective crimps is employed by Uniflex Hydraulik GmbH. These crimpers check the hydraulic pressure during or at the completion of every crimp cycle. A range of final crimp pressures is set for each crimp, so if the crimp falls outside the final pressure range, the crimp is considered out of specification.

SUMMARY

The present invention is directed to systems and methods which provide validation of the crimp or swaging process by using crimp or swage pressure (and thereby, force) monitoring apparatus, systems and methods. Preferably such apparatus, systems and methods employ automatic control systems and methods for the detection of defective crimps during hydraulic coupling to hose crimping or swaging processes. Detection of failure modes during the crimp process is beneficial because no additional labor or time is required to check the assemblies after crimping or swaging.

The present systems and methods may adapt a more-or-less standard crimping machine to practice the present invention through the installation of a Programmable Logic Controller (PLC), or the like, which employs a high speed data collection card, or the like, and one or more pressure sensors, such as a pressure transducer, to continuously monitor and analyze hydraulic pressure verses crimp diameter. The resulting system can detect the above-described failure modes during the crimp cycle.

Thus, in accordance with the present invention various embodiments of methods for crimp validation using crimp force monitoring might, following initiation of a crimp in a crimper, include monitoring a fluid pressure for carrying out the crimp at discrete diameters of the crimp, during the crimp. Crimp data reflecting the fluid pressure with respect to the diameters of the crimp during the crimp may be analyzed, during and/or after the crimp, to determine if the fluid pressure is above a minimum fluid pressure at particular diameters during the crimp and to determine if the fluid pressure is below a maximum fluid pressure during the particular diameters during the crimp. The fluid pressure being below the minimum fluid pressure during these particular diameters of the crimp may indicate a failure of the crimp. Such a failure of the crimp may be due to a failure to insert a hose over a stem and into a ferrule being crimped or the failure of the crimp may be due to failure to fully insert the hose over the stem and fully into the ferrule. Alternatively, the failure of the crimp may be due to an absence of serrations on an insert disposed in a ferrule being crimped. Alternatively, the incorrect hose may have been inadvertently selected or the incorrect crimp diameter set leading to failure of the crimp, even if the hose is fully inserted over the stem. The maximum fluid pressure, the minimum fluid pressure, and the particular diameters will vary according to the diameter of a ferrule being crimped.

Hence, a crimp performed in accordance with various embodiments of the present invention might begin by initiating a crimp in a crimper at an open diameter and closing the crimper at a first rate. Thereafter, the crimper may be slowed when the crimp reaches a slowdown crimp diameter, to a second crimp rate, which is preferably slower than the first, fast rate of closure. During the crimp and/or upon completion of the crimp, crimp data, comprising fluid pressure used to carry out the crimp compared to a diameter defined by dies of the crimper during the crimp, is analyzed to determine if the crimp is acceptable. As noted above, the analysis might include determining whether the fluid pressure is above a minimum fluid pressure at particular diameters during the crimp and whether the fluid pressure is below a maximum fluid pressure during the particular diameters during the crimp. Alternatively, the analysis might compare pressure and crimp diameter data for a current crimp with previous crimps in a production series and indicate where differences in pressure versus crimp diameter profiles show a variation significant enough to indicate an error in the crimping process.

Embodiments of systems for monitoring crimping of a fitting onto a hose end might include one or more pressure sensors, such as a pressure transducer, deployed in conjunction with the crimper to measure fluid pressure employed by the crimper to crimp a fitting. A diameter of dies of the crimper may be monitored during crimping by a linear variable displacement transducer, linear variable differential transformer, variable potentiometer, optical or ultrasonic transducers or the like. A programmable logic controller or the like is preferably interfaced with the crimper. This controller is also preferably connected to the sensor(s) to collect pressure data during the crimping and connected to the mechanism for monitoring the diameter of the dies during the crimping. The controller is employed to determine if the fluid pressure with respect to the diameters of the crimp during the crimp is above a minimum fluid pressure at particular diameters during the crimping, and/or to determine if the fluid pressure is below a maximum fluid pressure during these particular diameters during the crimping. The programmable logic controller may be operatively connected to the crimper in such a manner as to control operation of the crimper, particularly in response to a determination that crimp pressures are out-of-tolerance with respect to crimp diameters. Further, a data collection card or the like may be employed to collect data from the pressure sensor(s) and crimp diameter monitoring mechanism and to communicate the pressure and the diameters to the programmable logic controller.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
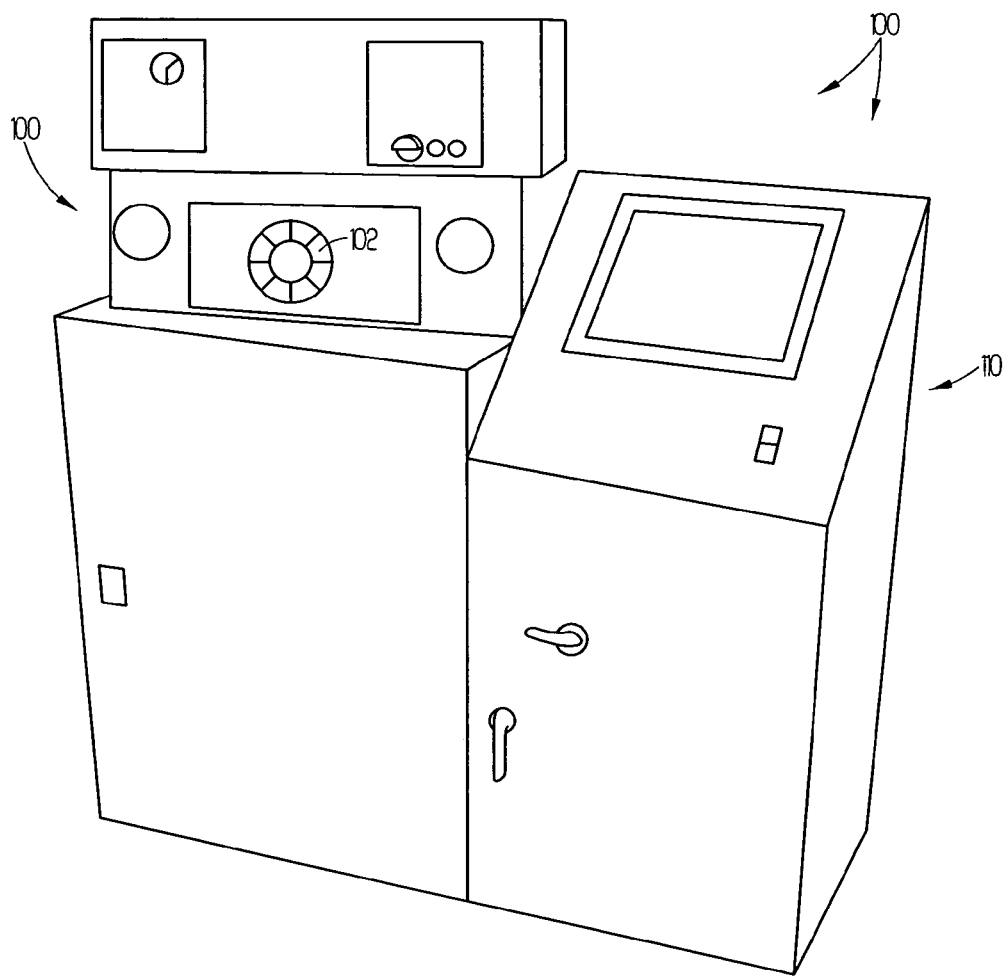
FIG. 1 is a general environmental view showing a controller deployed in conjunction with a crimper in accordance with the present invention.
Figure 2:
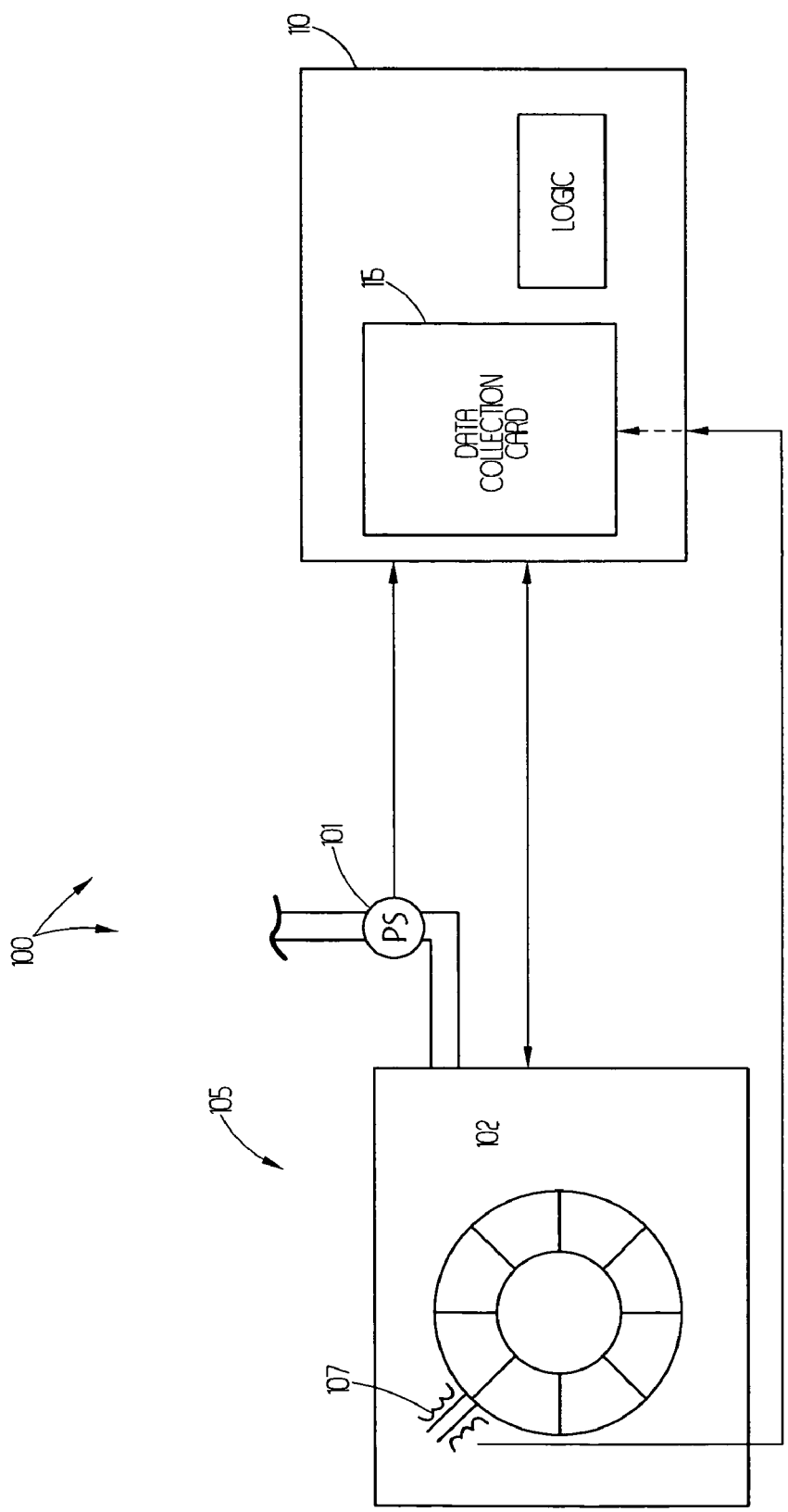
FIG. 2 is a diagrammatical illustration showing a controller deployed in conjunction with a crimper, pressure sensor, crimp diameter monitor and a data collection card in accordance with the present invention.

Example embodiment 100 of a system for monitoring crimping of a fitting onto a hose end, such as illustrated in FIGS. 1 and 2, might employ one or more pressure sensors 101, such as a pressure transducer or the like. Pressure sensor 101 may be deployed in a pressure line providing hydraulic or pneumatic pressure to close crimp dies 102 to measure fluid pressure employed by crimper 105 to crimp a fitting. A diameter of dies 102 of crimper 105 may be monitored during crimping by a displacement transducer such as a Linear Variable Differential Transformer (LVDT) 107, or the like. Programmable logic controller 110 or the like is preferably interfaced with crimper 105. This controller is also preferably connected to sensor(s) 101 to collect pressure data during crimping and also connected to the mechanism for monitoring the diameter of the dies during crimping. Controller 110 is employed to determine if the fluid pressure with respect to the diameters of the crimp during the crimp is above a minimum fluid pressure at particular diameters during the crimping, and/or to determine if the fluid pressure is below a maximum fluid pressure during particular diameters during the crimping.

The programmable logic controller may be operatively connected to the crimper in such a manner as to control operation of the crimper, particularly in response to a determination that crimp pressures are out-of-tolerance with respect to crimp diameters, such as discussed in greater detail below. Further, data collection card 115, or the like, may be employed to collect data from pressure sensor(s) 101 and crimp diameter monitoring mechanism 107, and to communicate the pressure and the diameters to programmable logic controller 110.

Figure 3:
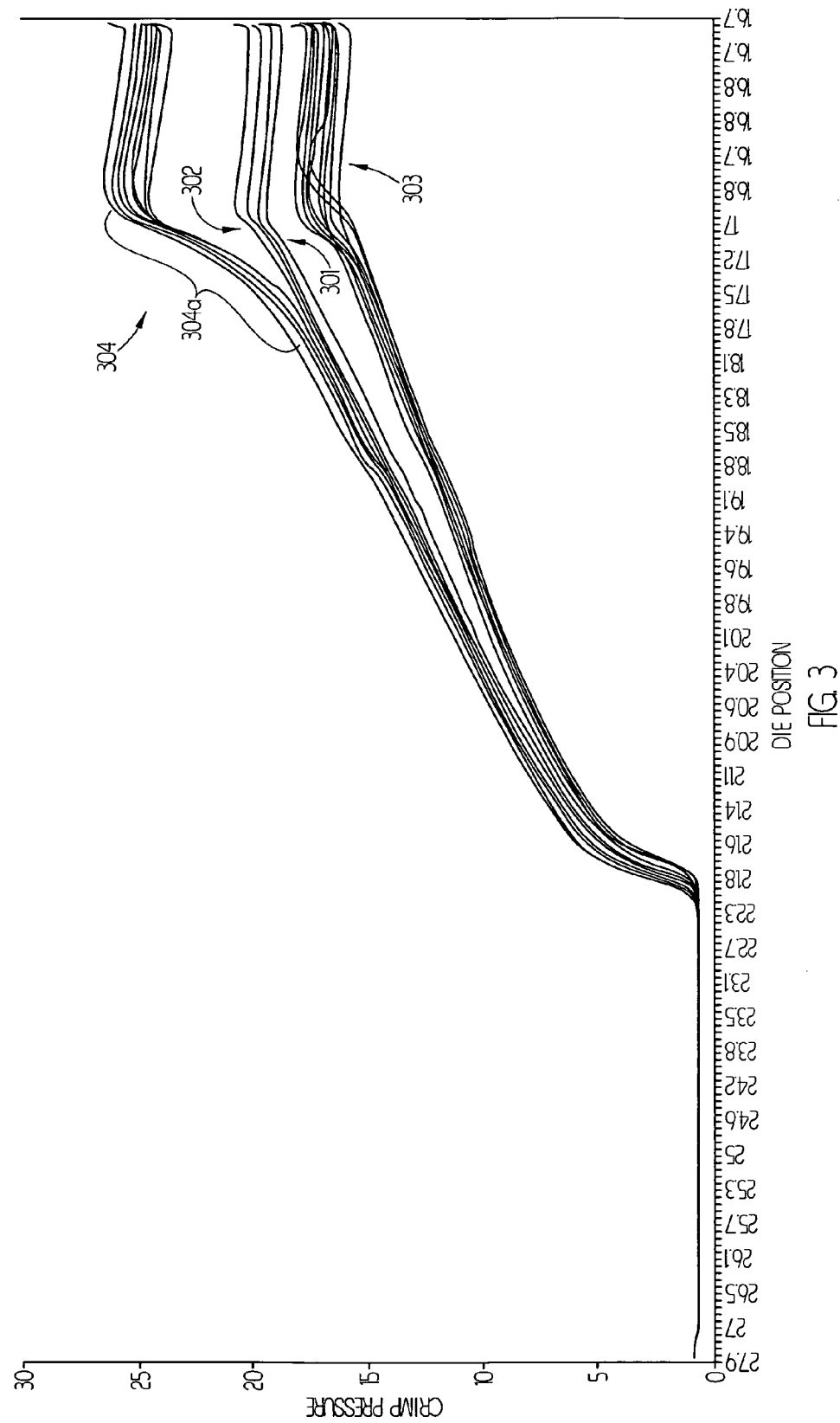
FIG. 3 is a graph showing crimp pressure versus crimp diameter in an exemplary set of acceptable and unacceptable crimps.
Figure 4:
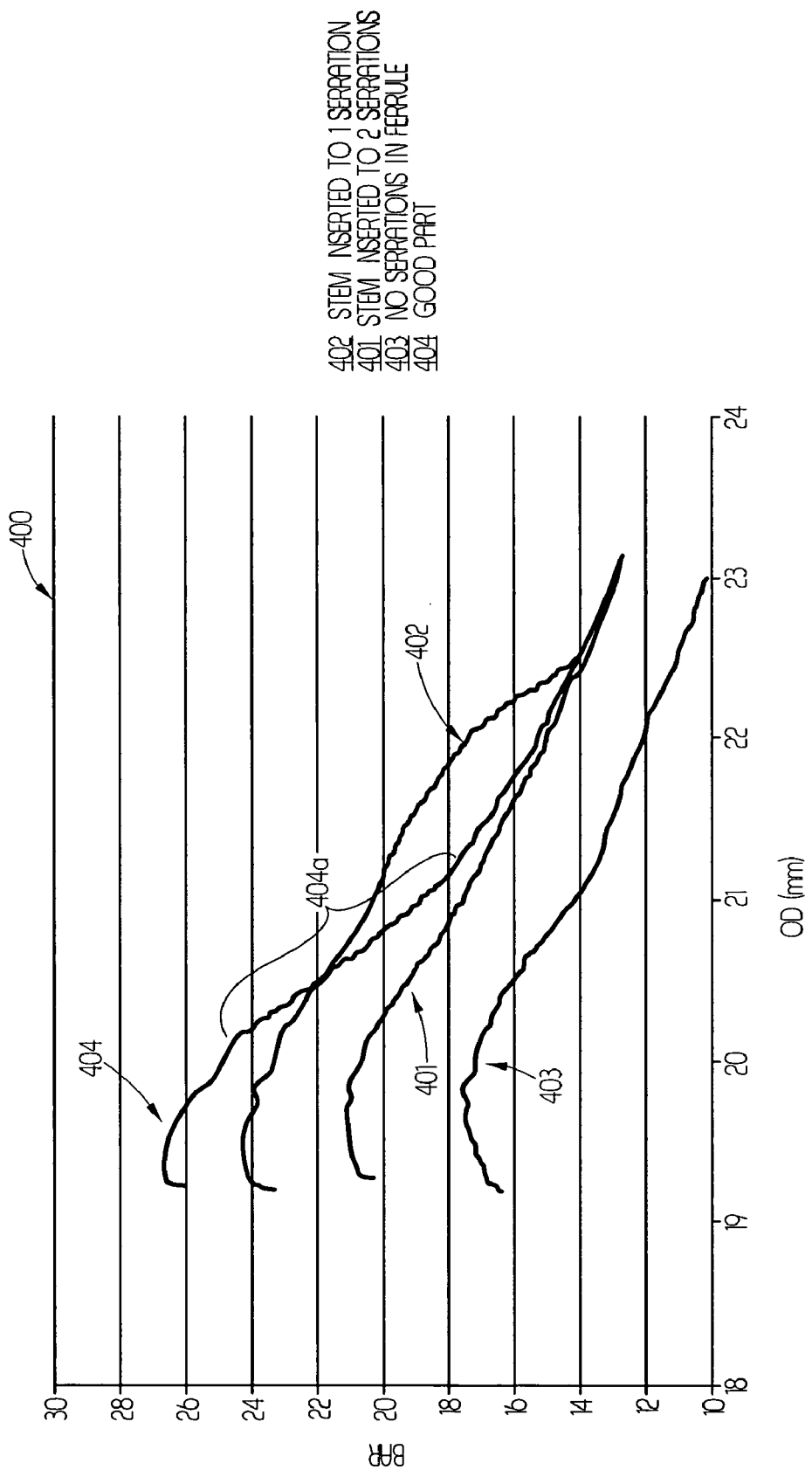
FIG. 4 is a simplified graph showing crimp pressure versus crimp diameter in acceptable and various unacceptable crimps.

In accordance with the present invention various embodiments of methods for crimp validation using crimp force monitoring might monitor a fluid pressure for carrying out the crimp through the use of sensors such as pressure sensor 101 at discrete diameters of a crimp, such as may be detected by LVDT 107, during the crimp. Crimp data reflecting the fluid pressure with respect to the diameters of the crimp during the crimp, such as the data graphed in FIGS. 3 and 4 may be analyzed, during and/or after the crimp. This analysis preferably determines if the fluid pressure is above a minimum fluid pressure at particular diameters during the crimp and if the fluid pressure is below a maximum fluid pressure during the particular diameters during the crimp. The fluid pressure being below the minimum fluid pressure during the particular diameters of the crimp, such as indicated at 301, 302 and 303 on FIG. 3 and by lines 401, 402 and 403 in FIG. 4, may indicate a failure of the crimp. Such a failure of the crimp may be due to a failure to insert a hose over a stem and into a ferrule being crimped such as might be indicated by pressure-to-crimp curves 301 and 401. Curves 302 and 402 generally show the failure mode of a crimp where failure is due to the hose not being fully inserted over the stem and fully into the ferrule. Failure of the crimp due to an absence of serrations on an insert disposed in a ferrule being crimped may result in a pressure-vs.-crimp diameter curve similar to 303 and 403. The maximum fluid pressure, the minimum fluid, and the particular diameters will vary according to the diameter of a ferrule being crimped. However, the general shape of the failure mode curves 301-303 and 401-403 will be similar, regardless of the diameter of the ferrule. Conversely, the pressure-to-crimp diameter curves for various diameter successfully crimped ferrules will be similar to curves 304 and 404.

In accordance with some embodiments of the present invention a first pressure versus diameter trace from a production run may be compared to a trace from a next crimp, looking for significant variations between the traces, then the trace from a next crimp may be compared with an envelope generated by the previous crimps to look for variations, and so on. As a result a pressure/diameter envelope is dynamically built as the production run progresses, and pressure versus diameter data for each subsequent crimp is reviewed for trace outliers which would indicate a fault.

Additionally, review of curves 301-304 and 401-404 may reveal that successful crimp curves 304 and 404 each have a steep slope portion 304*a* and 404*a*, which indicates a greater rate of change in pressure over a given change in diameter than any of the failure mode curves (301-303 and 401-403). Hence, in accordance with certain embodiments of the present invention the analysis of the crimp pressure and crimp diameter data might employ an analysis of such a rate of change to differentiate good crimps from bad.

In accordance with embodiments of the present invention the final crimp diameter and/or start diameter may be programmed into the controller, such as through the use of a bar code disposed on the fitting to be crimped. Preferably, this eliminates incorrect crimp diameter and minimizes excess die travel.

Therefore, in accordance with various embodiments of the present invention the present systems and methods compare a crimp's resistance (as expressed by the monitored pressure) with an optimum resistance (pressure) throughout the change in diameter of a fitting ferrule as it is crimped. Preferably the present system locks-out the crimper if the resistance is under or over this optimum. This provides a more-or-less fool-proof system for detecting a number of crimping failure modes, such as missing insert convolutions, the coupling not being fully pushed on, no wire reinforcement in the end of the hose, etc.

Figure 5:
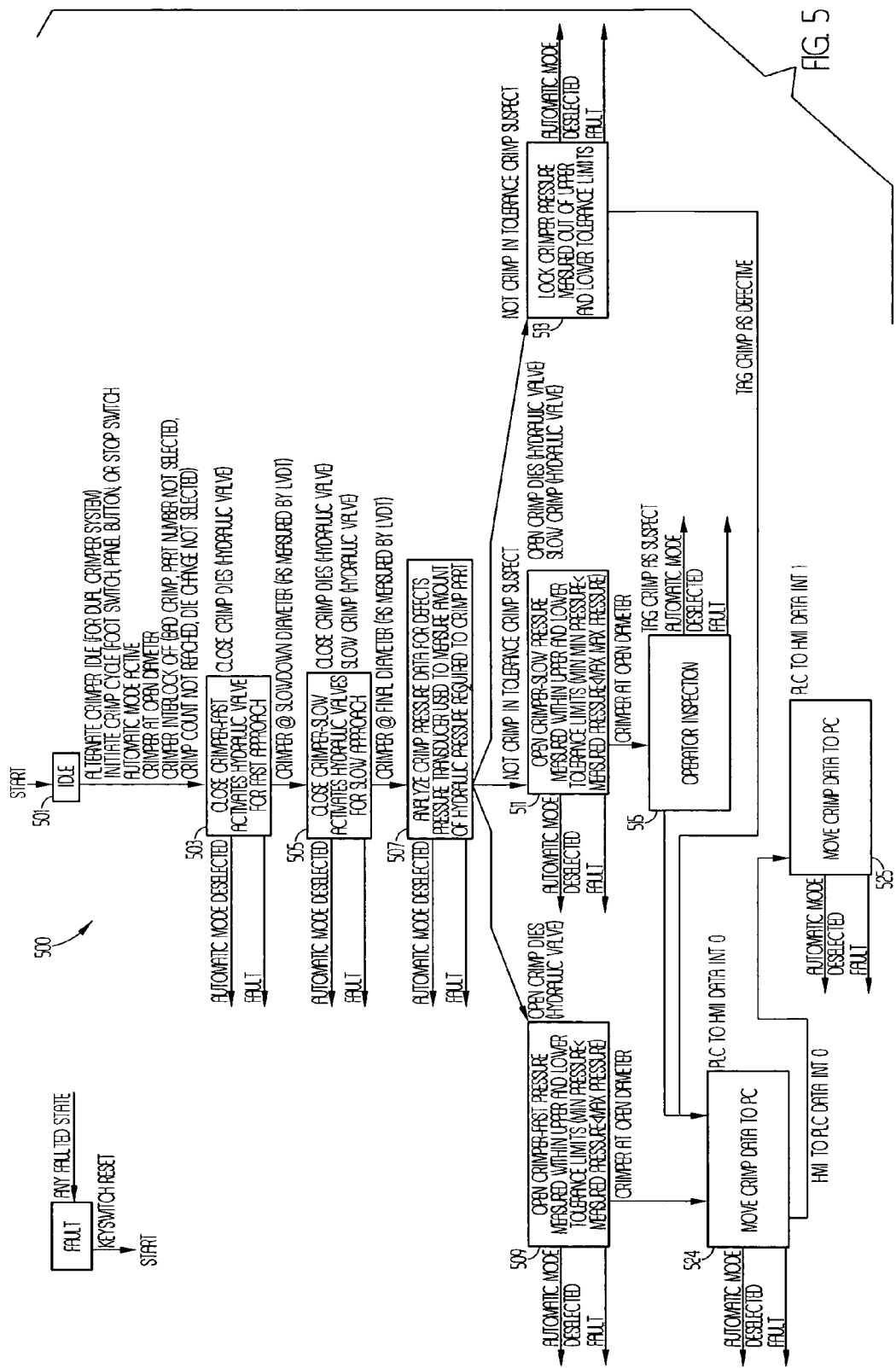
FIG. 5 is a flow chart of an embodiment of a monitored crimp process carried out in accordance with the present invention.

Turning to the flowchart of FIG. 5, depicting crimp 500 performed in accordance with various embodiments of the present invention, at 501 a crimp cycle is initiated in an idle crimper, which employs an embodiment of the present crimp validation system. Initiation 501 may be by activation of a foot switch, the pressing of a control panel button, action of a part locator switch, or the like. By default, the crimper may be in an automatic mode. At any point during the crimp process, the automatic mode may be exited, such as by de-selection on a control panel, whereupon the crimper will abort the crimp process and return to an idle state. At initiation at 501, the dies of the crimper are at an open diameter (i.e. fully open for the selected crimp process) and if the crimper has an interlock, it is off. The interlock may be engaged for a number of reasons such as: if the system detected that the previous crimp pressure was out of system tolerances, in which case a keyswitch may be required for reset; a part number is not selected (Preferably the present systems require an operator to select a part number before operation. This ensures that proper crimp parameters are loaded into the system); a selected crimp count is reached (Preferably, the system "locks out" a crimper when it reaches a desired quantity. This ensures that the crimpers cycle no more than the entered order quantity); and/or a die change function is selected, a machine mode used for the removal of crimp dies (Preferably, the system is "locked out" during this mode, for safety and to facilitate the die change.)

At 503 the crimper first begins to close in a "fast" mode. Selection to close the crimper in this fast mode activates a hydraulic valve to close the crimp dies for a fast approach or is a function of the slope of the actuation ramp of the crimp cylinder relative to the die fingers, the initial actuation ramp being steeper than the second actuation ramp therefore initially closing the die diameter at a faster rate than the second actuation ramp. This provides a "fast attack" and slow crimp. As the crimper reaches a "slowdown" diameter, such as may be measured by an LVDT, or the like, the crimper slows at 505 to a slower, second close rate. During steps 503 and 505 of the crimping operation the pressure required to carry out the crimp, with respect to the crimp diameter, is recorded.

During the crimp and/or upon completion of the crimp, crimp data, comprising fluid pressure used to carry out the crimp, compared to a diameter defined by dies of the crimper during the crimp, is analyzed to determine if the crimp is acceptable. For example, once the crimper reaches the final crimp diameter, as measured by the LVDT, analysis may be carried out at 507 of crimp pressure verses crimp diameter data gathered during steps 503 and 505. If it is determined at 507 that the crimp pressure-to-crimp diameter curve followed a path similar to curve 304 or 404 depicted in FIG. 3 or 4, respectively, and the measured pressures during the crimp were greater than a threshold minimal pressure and less than a threshold maximum pressure, the crimp is considered to be in-tolerance and the crimper is opened in a rapid (fast) manner at 509 for removal of the crimped part. Data for this in-tolerance crimp may be moved to a general purpose processor-based device hosting the PLC at 524 and at 525 the data is stored. This data may be used setting (or refining) crimp pressure limits and/or crimp pressure-to-crimp diameter limits for future crimps. Process 500 then returns to crimp initiation 501.

If at 507 it is determined that the pressure to crimp diameter curve fails to follow a path similar to curve 304 or 404, the crimp is suspect, possibly even if the measured pressures during the crimp were greater than a threshold minimal pressure and less than a threshold maximum pressure. At 511 the crimper is opened in a slow manner and at 515 the crimp is inspected by the operator and may be tagged for further inspection. Data for this suspect crimp may also be moved to a general purpose processor-based device hosting the PLC at 524, and at 525 the data may also be stored. This data may also be used for setting (or refining) crimp pressure limits and or crimp pressure-to-crimp diameter limits for future crimps. Process 500 then returns to crimp initiation 501.

If at 507 it is determined that the pressure to crimp diameter curve fails to follow a path similar to curve 304 or 404 and the measured pressures during the crimp were greater than a threshold minimal pressure or less than a threshold maximum pressure, the crimp is considered to be defective, the crimper is locked at 513 and the part is tagged as defective. Data for this defective crimp may also be moved to the general purpose processor-based device hosting the PLC at 524, and at 525 the data may also be stored. This data may also be used for setting (or refining) crimp pressure limits and or crimp pressure-to-crimp diameter limits for future crimps, particularly for defining out-of tolerance and defective crimps. Process 500 then returns to crimp initiation 501.

In accordance with various embodiments of the present invention, the above described crimping operation may be carried out and the part inspected to ensure, and or to provide data for, calibration of the crimper as wear and use mean that the correlation between pressure and crimp force (as may be expressed as the crimp pressure) change over time. In other words, as a new crimper is "broken-in" less force may be required to carry out a satisfactory crimp, or conversely, as crimper components or dies wear over time, the force needed to carry out the same crimp may increase, thus the optimal crimp pressure-to-crimp diameter curve(s) may change, calling for such recalibration.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   initiating a crimp in a crimper;
   monitoring a fluid pressure for carrying out said crimp at discrete diameters of said crimp, during said crimp;
   analyzing crimp data reflecting said fluid pressure with respect to said diameters of said crimp during said crimp to determine if said fluid pressure is above a minimum fluid pressure at particular diameters during said crimp and said fluid pressure is below a maximum fluid pressure during said particular diameters during said crimp; and
   said maximum fluid pressure, said minimum fluid pressure and said particular diameters vary according to the diameter of a ferrule being crimped.

2. The method of claim 1 wherein said fluid pressure being below said minimum fluid pressure during said particular diameters of said crimp indicates a failure of said crimp.

3. The method of claim 2 wherein said failure of said crimp is due to failure to insert a hose over a stem and into the ferrule being crimped by said crimp.

4. The method of claim 2 wherein said failure of said crimp is due to failure to fully insert a hose over a stem and fully into the ferrule being crimped by said crimp.

5. The method of claim 2 wherein said failure of said crimp is due to an absence of serrations on an insert disposed in the ferrule being crimped by said crimp.

6. The method of claim 2 wherein said failure of said crimp is due to defective or incorrectly selected hose.

7. The method of claim 2 wherein said failure of said crimp is due to incorrect selection of crimp data for a hose, stem or ferrule being crimped.

8. The method of claim 1 wherein said analyzing is carried out during said crimp.

9. The method of claim 1 wherein said analyzing is carried out following completion of said crimp.

10. The method of claim 1 wherein said monitoring is carried out during each crimp in a production run and said analyzing determines if said fluid pressure is above a minimum fluid pressure at particular diameters during said crimp and said fluid pressure is below a maximum fluid pressure during said particular diameters during said crimp based on prior crimps in said production run.

11. A method comprising:
    initiating a crimp in a crimper at an open diameter;
    closing said crimper at a first rate;
    slowing down said crimper at a slowdown crimp diameter to a second crimp rate, slower than said first rate;
    analyzing crimp data, said crimp data comprising fluid pressure used to carry out said crimp compared to a diameter defined by dies of said crimper during said crimp to determine if said crimp is acceptable; and
    wherein said crimp is a part of a production run and said analyzing further comprises comparing said crimp data to crimp data from previous crimps during said production run to determine if said crimp data varies from an envelope of crimp data defined by said previous crimps from said production run.

12. The method of claim 11 wherein said analyzing comprises determining if said fluid pressure is above a minimum fluid pressure at particular diameters during said crimp and said fluid pressure is below a maximum fluid pressure during said particular diameters during said crimp.

13. The method of claim 12 wherein said fluid pressure being below said minimum fluid pressure during said particular diameters of said crimp indicates said crimp is unacceptable.

14. The method of claim 13 wherein said crimp is unacceptable due to failure to insert a hose over a stem and into a ferrule being crimped by said crimp.

15. The method of claim 13 wherein said crimp is unacceptable due to failure to fully insert a hose over a stem and fully into a ferrule being crimped by said crimp.

16. The method of claim 13 wherein said crimp is unacceptable due to an absence of serrations on an insert disposed in a ferrule being crimped by said crimp.

17. The method of claim 13 wherein said failure of said crimp is due to defective or incorrectly selected hose.

18. The method of claim 13 wherein said failure of said crimp is due to incorrect selection of crimp data for a hose, stem or ferrule being used in said crimp.

19. The method of claim 12 wherein said maximum fluid pressure, said minimum fluid, and said particular diameters vary according to the diameter of a ferrule being crimped.

20. The method of claim 11 wherein said analyzing is carried out during said crimp.

21. The method of claim 11 wherein said analyzing is carried out following completion of said crimp.

* * * * *